(12) United States Patent
Huang et al.

(10) Patent No.: US 8,897,318 B2
(45) Date of Patent: Nov. 25, 2014

(54) NETWORK DEVICE AND NETWORK CONNECTING METHOD

(75) Inventors: Liang-Wei Huang, Hsinchu (TW); Shieh-Hsing Kuo, Hsinchu (TW); Li-Han Liang, Taipei (TW); Tzu-Han Hsu, Kaohsiung (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 310 days.

(21) Appl. No.: 13/305,747

(22) Filed: Nov. 29, 2011

(65) Prior Publication Data

US 2012/0134372 A1 May 31, 2012

(30) Foreign Application Priority Data

Nov. 29, 2010 (TW) .............................. 99141248 A

(51) Int. Cl.
*H04L 12/66* (2006.01)
*H04L 12/46* (2006.01)
*H04L 29/08* (2006.01)

(52) U.S. Cl.
CPC ...... *H04L 12/4625* (2013.01); *H04L 29/08009* (2013.01); *H04L 29/08018* (2013.01)
USPC ............................ 370/463; 370/464; 370/230

(58) Field of Classification Search
CPC ... H04L 67/12; H04L 67/34; H04L 29/08009; H04L 29/08018; H04J 13/0062; H04J 11/0033; H04J 2203/0046
USPC .......................................... 370/464, 230, 463
See application file for complete search history.

(56) References Cited

U.S. PATENT DOCUMENTS

| | | | |
|---|---|---|---|
| 5,754,540 A * | 5/1998 | Liu et al. ........................ | 370/315 |
| 6,269,104 B1 * | 7/2001 | McLaughlin et al. ........ | 370/464 |
| 6,430,695 B1 * | 8/2002 | Bray et al. ..................... | 713/501 |
| 6,816,505 B1 | 11/2004 | Sutardja | |
| 7,835,427 B1 * | 11/2010 | Chavez et al. ................ | 375/219 |
| 8,018,962 B1 * | 9/2011 | Sutardja et al. ............... | 370/419 |
| 8,063,504 B2 * | 11/2011 | Chi .................................. | 307/1 |
| 8,130,786 B2 * | 3/2012 | Furlong et al. ................ | 370/463 |
| 2002/0094087 A1 * | 7/2002 | Dellmo et al. ................ | 380/270 |
| 2002/0126684 A1 * | 9/2002 | Findlater et al. ............. | 370/419 |
| 2003/0191883 A1 * | 10/2003 | April ............................. | 710/305 |
| 2009/0189442 A1 | 7/2009 | Chi | |
| 2009/0232151 A1 | 9/2009 | Furlong | |
| 2011/0286393 A1 * | 11/2011 | Fouren et al. ................. | 370/328 |
| 2012/0099600 A1 * | 4/2012 | Tsai ............................... | 370/401 |

* cited by examiner

*Primary Examiner* — Ricky Ngo
*Assistant Examiner* — Dewanda Samuel
(74) *Attorney, Agent, or Firm* — Winston Hsu; Scott Margo

(57) ABSTRACT

A network device includes a first transceiver unit, a second transceiver unit and a control unit. The first transceiver unit is utilized for processing a data corresponding to a first physical (PHY) layer via a first interface. The second transceiver unit is utilized for processing a data corresponding to a second PHY layer via a second interface. The control unit is utilized for processing a data corresponding to a media access control (MAC) layer, wherein the control unit connects with at least one of the first transceiver unit and the second transceiver unit with reference to a connection scheme.

16 Claims, 5 Drawing Sheets

NETWORK DEVICE AND NETWORK CONNECTING METHOD

BACKGROUND

1. Technical Field

The present disclosure relates to a network device.

2. Description of the Related Art

Currently, High-Definition Multimedia Interface version 1.4 (HDMI 1.4) supports an Ethernet transmission, such that traditional Ethernet's wiring can be replaced by HDMI's cable.

However, system vendors such as DVD providers cannot ensure whether the clients support HDMI 1.4 and Ethernet transmission or not at the initial stage. For this reason, the system vendors certainly will reserve both the traditional Ethernet connector and the HDMI connector with Ethernet functions in hardware, and thus two groups of media access control layer circuits (MAC circuits) and physical layer circuits (PHY circuits) are required.

For example, one group of MAC circuit and PHY circuit is connected to an asymmetric digital subscriber line (ADSL) via the RJ-35 network connection, while another group of MAC circuit and PHY circuit is connected to the TV via HDMI and then connected to the ADSL via the TV. In doing so, a loop may be formed in the network so as to cause frame circulation and frame propagation in the loop, or even cause broadcast storm occupying lots of network bandwidth. A way of solving the problem resulted from the network loop is to adopt a spanning tree protocol (STP). However, by adopting the spanning tree protocol, it usually results in disadvantages of occupying a lot of resources of the processor and memories.

Hence, how to avoid the problem caused by the network loop itself has become an important issue to be solved by designers in this field.

BRIEF SUMMARY

It is therefore one of the objectives of the present disclosure to provide a network device having a first transceiver unit for processing a data corresponding to a first PHY layer via a first interface and a second transceiver unit for processing a data corresponding to a second PHY layer via a second interface, and a method for building a network connection through a connection scheme to solve the above-mentioned problems caused by the network loop.

With reference to one aspect of the present disclosure, an exemplary network device is provided. The network device may include a first transceiver unit, a second transceiver unit, and a control unit. The first transceiver unit is arranged for processing a data corresponding to a first physical (PHY) layer via a first interface. The second transceiver unit is arranged for processing a data corresponding to a second PHY layer via a second interface. The control unit is arranged for processing a data corresponding to a media access control (MAC) layer, wherein the control unit connects with at least one of the first transceiver unit and the second transceiver unit with reference to a connection scheme.

With reference to another aspect of the present disclosure, an exemplary network connecting method is provided. The method may include the following steps: utilizing a first transceiver unit for processing a data corresponding to a first PHY layer via a first interface; utilizing a second transceiver unit for processing a data corresponding to a second PHY layer via a second interface; utilizing a control unit for processing a data corresponding to a MAC layer; and connecting the control unit with at least one of the first transceiver unit and the second transceiver unit with reference to a connection scheme.

Compared with the Related art, the circuit area of a media access control (MAC) layer circuit can be saved. In addition, although there are two physical (PHY) layer circuits existed in the present disclosure, only one MAC layer circuit is required. As a result, the problem caused by the network loop can be avoided in order to save system resources. Moreover, these two PHY layer circuits have the same hardware architecture, and thus they can use the same package so as to save cost.

These and other objectives of the present disclosure will no doubt become obvious to those of ordinary skill in the art after reading the following detailed description of the embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
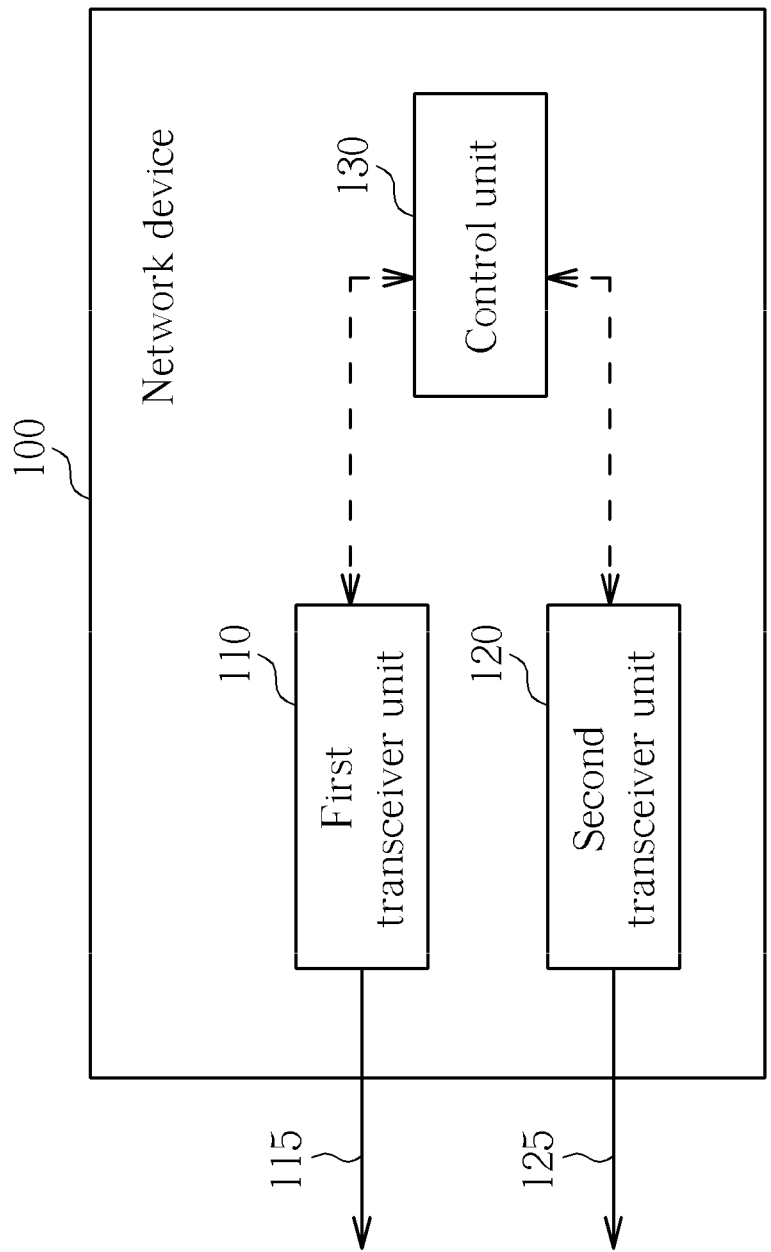
FIG. 1 is a block diagram of a network device with reference to a first embodiment.

Please refer to FIG. 1. FIG. 1 is a block diagram of a network device 100 with reference to a first embodiment. As shown in FIG. 1, the network device 100 may include, but is not limited to, a first transceiver unit 110, a second transceiver unit 120, and a control unit 130. The first transceiver unit 110 is arranged for processing a data corresponding to a first physical (PHY) layer via a first interface 115, and the second transceiver unit 120 is arranged for processing a data corresponding to a second PHY layer via a second interface 125. The control unit 130 is arranged for processing a data corresponding to a media access control (MAC) layer, wherein the control unit 130 connects with at least one of the first transceiver unit 110 and the second transceiver unit 120 with reference to a connection scheme. Please note that: in this embodiment, the first interface 115 can be implemented by a high definition multimedia interface (HDMI) and the second interface 125 can be implemented by a RJ-45 network interface, but this in no way should be considered as a limitation of the present disclosure.

For example, in a first case, when the connection scheme indicates that the first transceiver unit 110 and the second transceiver unit 120 are not connected to a network, the control unit 130 connects with the first transceiver unit 110 and the second transceiver unit 120 with reference to the connection scheme. In a second case, when the connection scheme indicates that one of the first transceiver unit 110 and the second transceiver unit 120 is connected to a network and the other one of the first transceiver unit 110 and the second transceiver unit 120 is not connected to the network, the control unit 130 connects with the transceiver unit which is connected to the network and does not connect with the transceiver unit which is not connected to the network. In a third case, when the connection scheme indicates that both the first transceiver unit 110 and the second transceiver unit 120 are connected to a network, the control unit 130 selects to connect with one of the first transceiver unit 110 and the second transceiver unit 120. In other words, the control unit 130 can dynamically switch the connection between the first transceiver unit 110 and/or the second transceiver unit 120 depending on actual demands.

Figure 2:
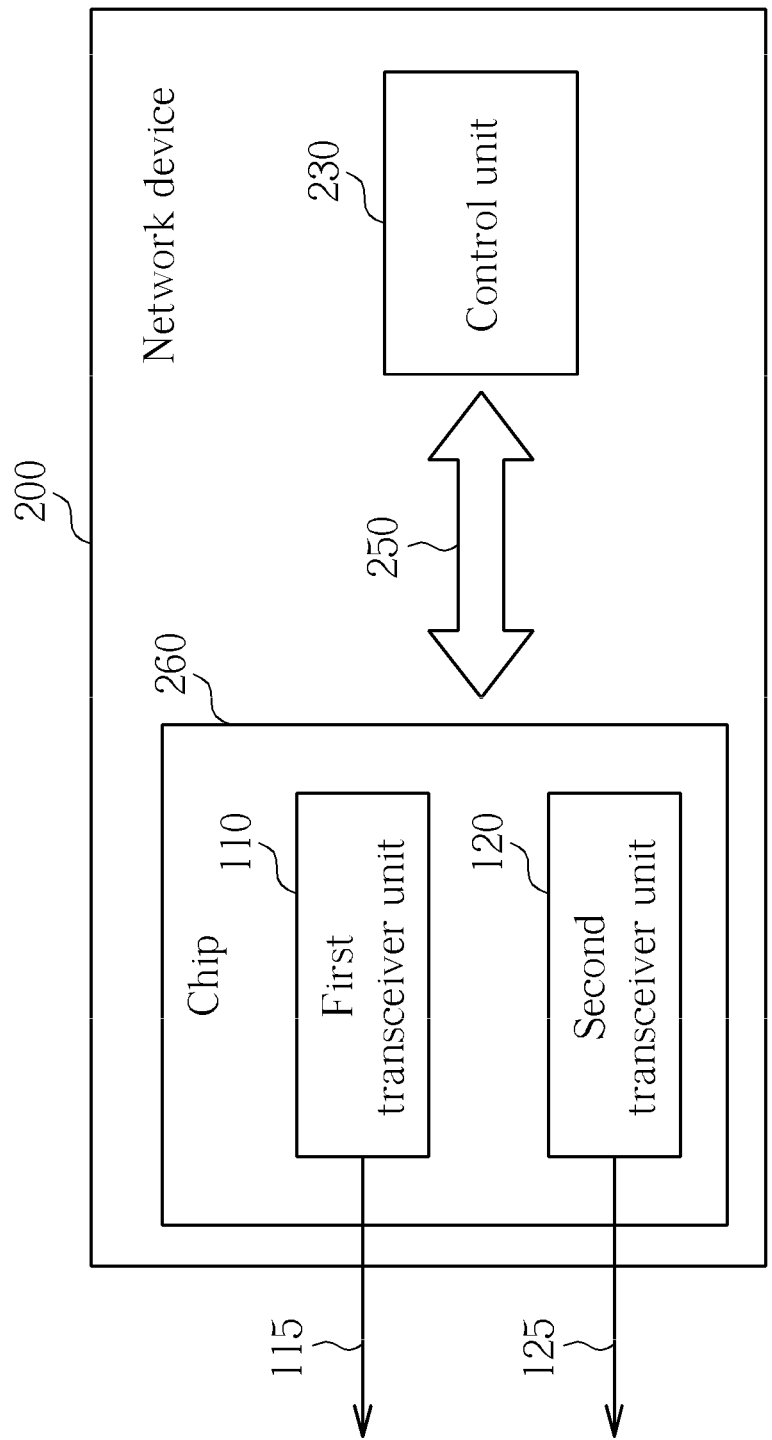
FIG. 2 is a block diagram of a network device with reference to a second embodiment.

Please note that: in this embodiment, the control unit 130, the first transceiver unit 110, and the second transceiver unit 120 can be disposed in the same chip, but this should not be considered to be limitations of the present disclosure. In other embodiments, the control unit 130 and the second transceiver unit 120 can be disposed in different chips, as is shown in FIG. 2. FIG. 2 is a block diagram of a network device 200 with reference to a second embodiment of the present disclosure. The architecture of the network device 200 shown in FIG. 2 is similar to that of the network device 100 shown in FIG. 1, and the difference between them is that: a control unit 230 of the network device 200 shown in FIG. 2 is disposed in another chip different from a chip in which the first transceiver unit 110 and the second transceiver unit 120 are disposed. For example, in FIG. 2, both of the first transceiver unit 110 and the second transceiver unit 120 are disposed on the same chip 260, while the control unit 230 is externally connected to the first transceiver unit 110 and the second transceiver unit 120 via a third interface 250, but the present disclosure is not limited to this only. In other embodiments of the present disclosure, the first transceiver unit 110 and the second transceiver unit 120 can be implemented by a single PHY chip, and the control unit may be externally connected to the first transceiver unit 110 and the second transceiver unit 120 via the third interface 250.

Please note that: the abovementioned third interface 250 may be implemented by a media independent interface (MII), a reverse media independent interface (RMII), a gigabit media independent interface (GMII), or a reverse gigabit media independent interface (RGMII), but this in no way should be considered as a limitation of the present disclosure. Those skilled in the art can easily understand technical features related to these interfaces, and further description is omitted here for brevity.

Figure 3:
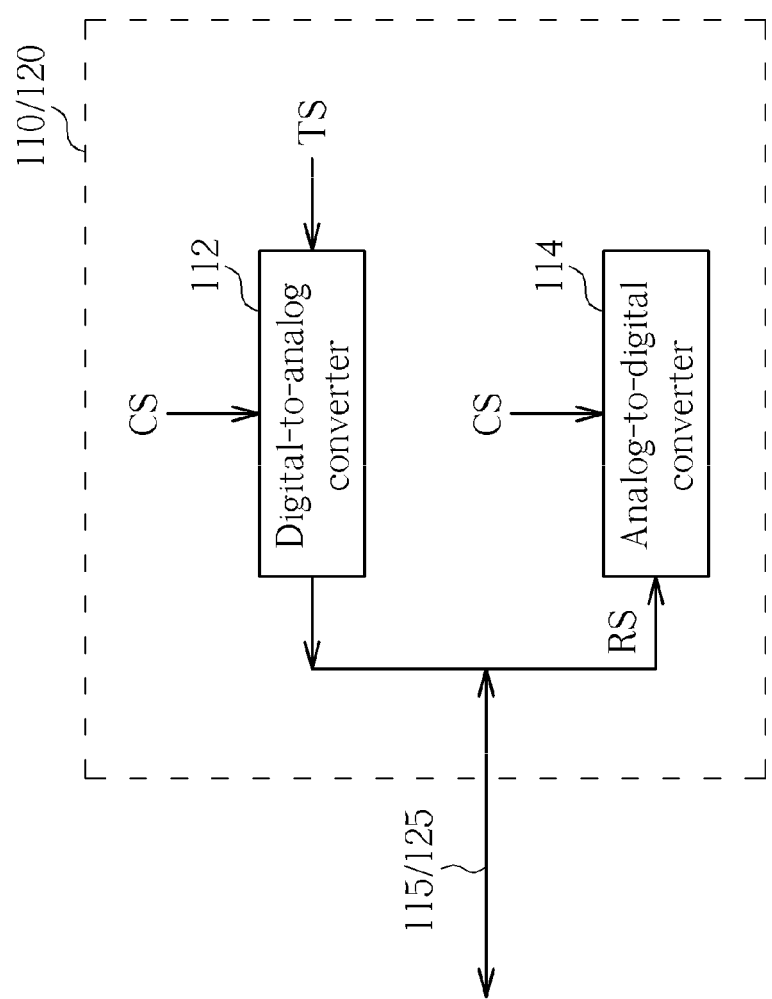
FIG. 3 is a diagram showing the first transceiver unit and the second transceiver unit of the network device shown in FIG. 1 or FIG. 2.

Please refer to FIG. 3. FIG. 3 is a diagram showing the first transceiver unit 110 and the second transceiver unit 120 of the network device 100/200 shown in FIG. 1 or FIG. 2. As shown in FIG. 3, each of the first transceiver unit 110 and the second transceiver unit 120 may include, but is not limited to, a digital-to-analog converter (DAC) 112 and an analog-to-digital converter (ADC) 114. That is to say, a combination of the digital-to-analog converter 112 and the analog-to-digital converter 114 shown in FIG. 3 can be viewed as the first transceiver unit 110/the second transceiver unit 120. As far as the first transceiver unit 110 is concerned, the digital-to-analog converter 112 and the analog-to-digital converter 114 are connected to the first interface 115. Under this condition, the digital-to-analog converter 112 is arranged for converting a first logic level (such as, a high logic level "1") of a transmission signal TS transmitted by the first transceiver unit 110 into a first voltage potential and converting a second logic level (such as, a low logic level "0") of the transmission signal TS into a second voltage potential with reference to a control signal CS; and the analog-to-digital converter 114 is arranged for converting the first voltage potential of a receiving signal RS received by the first transceiver unit 110 into the first logic level (i.e., the high logic level "1") and converting the second voltage potential of the receiving signal RS into the second logic level (i.e., the low logic level "0") with reference to the control signal CS. What calls for special attention is that: a voltage difference between the first voltage potential and the second voltage potential is equal to a first voltage amplitude supported by the first interface 115.

On the other hand, as far as the second transceiver unit 120 is concerned, the digital-to-analog converter 112 and the analog-to-digital converter 114 are connected to the second interface 125. Under this condition, the digital-to-analog converter 112 is arranged for converting a first logic level (such as, a high logic level "1") of a transmission signal TS transmitted by the second transceiver unit 120 into a third voltage potential and converting a second logic level (such as, a low logic level "0") of the transmission signal TS into a fourth voltage potential with reference to the control signal CS; and the analog-to-digital converter 114 is arranged for converting the third voltage potential of a receiving signal RS received by the second transceiver unit 120 into the first logic level (i.e., the high logic level "1") and converting the fourth voltage potential of the receiving signal RS into the second logic level (i.e., the low logic level "0") with reference to the control signal CS. What calls for special attention is that: a voltage difference between the third voltage potential and the fourth voltage potential is equal to a second voltage amplitude supported by the second interface 125, and the first voltage amplitude supported by the first interface 115 is different from the second voltage amplitude supported by the second interface 125.

Please note that: in other embodiments, each of the first transceiver unit 110 and the second transceiver unit 120 may further include a gain amplifier (not shown) for amplifying the second voltage potential or the fourth voltage potential of the abovementioned receiving signal RS depending on actual demands, which also belongs to the scope of the present disclosure.

As can be known from the descriptions related to FIG. 3, the first transceiver unit 110 and the second transceiver unit 120 have the same hardware components, which can support different voltage amplitudes of different interfaces through the control signal CS. That is to say, two transceiver units (i.e., the first transceiver unit 110 and the second transceiver unit 120) can use the same package so as to save cost. Or in other embodiments of the present disclosure, two transceiver units can share the same hardware components.

Figure 4:
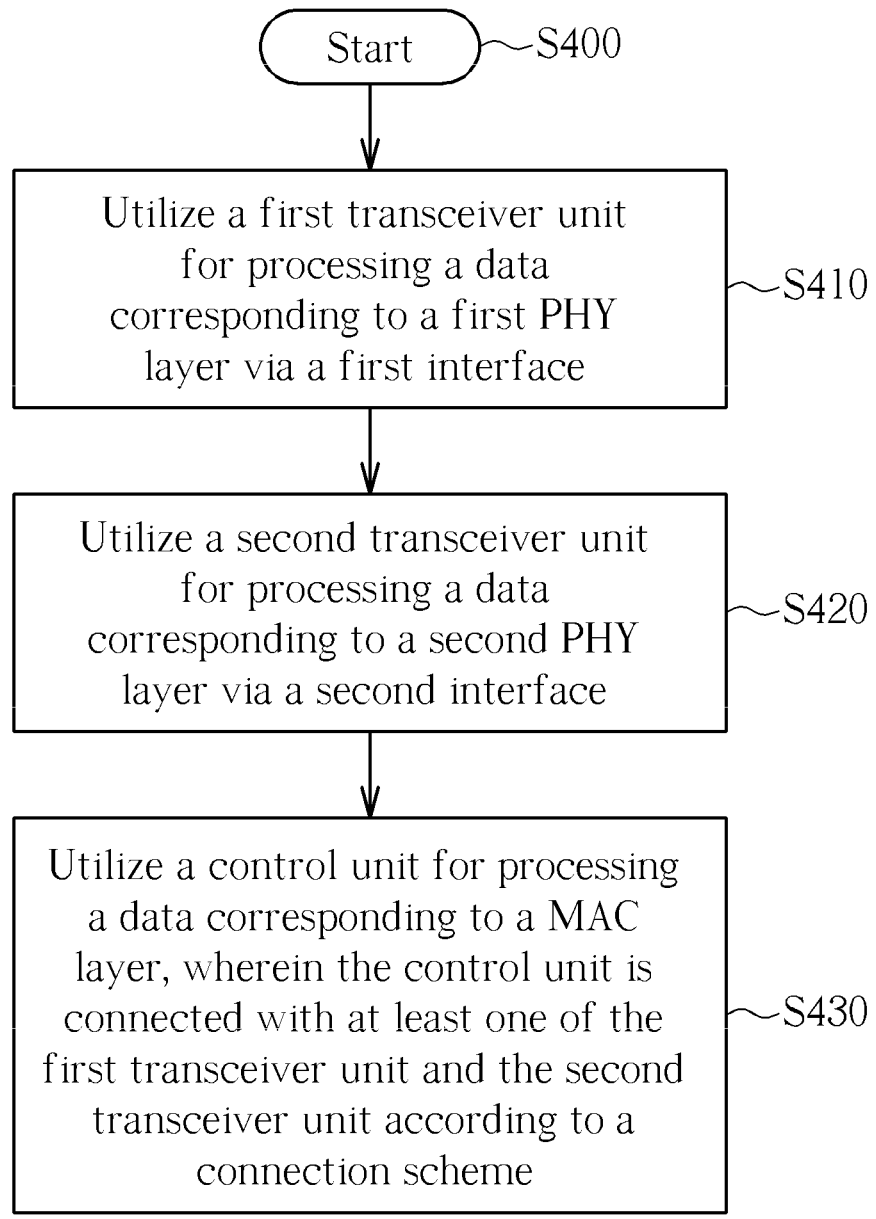
FIG. 4 is a flowchart illustrating a network connection method with reference to an exemplary embodiment.

Please refer to FIG. 4. FIG. 4 is a flowchart illustrating a network connection method with reference to an exemplary embodiment. Please note that the following steps are not limited to be performed with reference to the exact sequence shown in FIG. 4 if a roughly identical result can be obtained. The method may include, but is not limited to, the following steps:

Step S400: Start.

Step S410: Utilize a first transceiver unit for processing a data corresponding to a first PHY layer via a first interface.

Step S420: Utilize a second transceiver unit for processing a data corresponding to a second PHY layer via a second interface.

Step S430: Utilize a control unit for processing a data corresponding to a MAC layer, wherein the control unit is connected with at least one of the first transceiver unit and the second transceiver unit with reference to a connection scheme.

Those skilled in the art can readily understand how each element operates by combining the steps shown in FIG. 4 and the elements shown in FIG. 1 or FIG. 2, and further description is omitted here for brevity.

Figure 5:
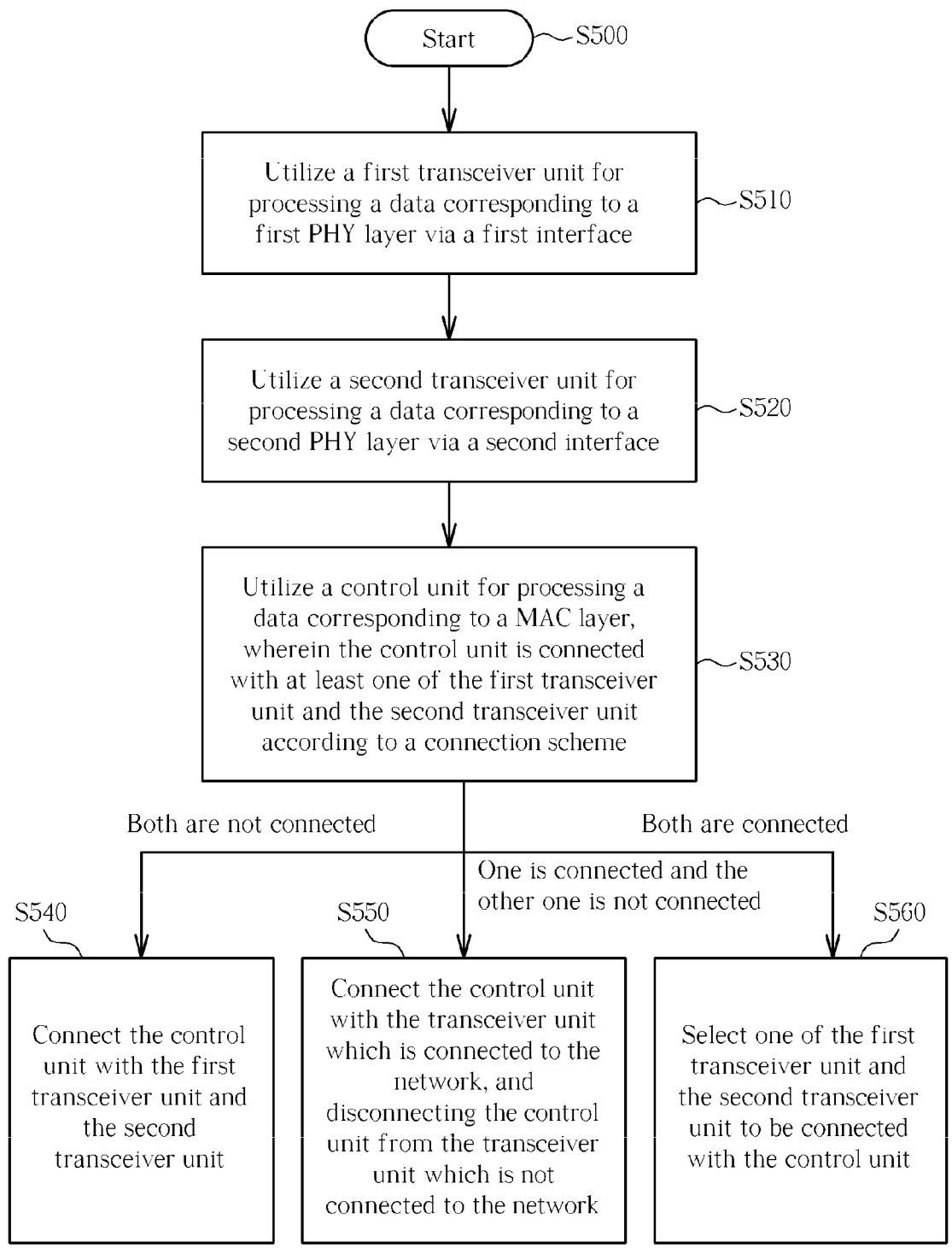
FIG. 5 is a flowchart illustrating a network connection method with reference to another exemplary embodiment.

Please refer to FIG. 5. FIG. 5 is a flowchart illustrating a network connection method with reference to another exemplary embodiment of the present disclosure. Please note that the following steps are not limited to be performed with reference to the exact sequence shown in FIG. 5 if a roughly identical result can be obtained. The method may include, but is not limited to, the following steps:

Step S500: Start.

Step S510: Utilize a first transceiver unit for processing a data corresponding to a first PHY layer via a first interface.

Step S520: Utilize a second transceiver unit for processing a data corresponding to a second PHY layer via a second interface.

Step S530: Utilize a control unit for processing a data corresponding to a MAC layer, wherein the control unit is connected with at least one of the first transceiver unit and the second transceiver unit with reference to a connection scheme. When the connection scheme indicates that the first transceiver unit and the second transceiver unit are not connected to a network, go to the step S540; when the connection scheme indicates that one of the first transceiver unit and the second transceiver unit is connected to a network and the other one of the first transceiver unit and the second transceiver unit is not connected to the network, go to the step S550; and when the connection scheme indicates that both the first transceiver unit and the second transceiver unit are connected to a network, go to the step S560.

Step S540: Connect the control unit with the first transceiver unit and the second transceiver unit (under this condition, the connection scheme indicates that the first transceiver unit and the second transceiver unit are not connected to a network).

Step S550: Connect the control unit with the transceiver unit which is connected to the network, and disconnecting the control unit from the transceiver unit which is not connected to the network (under this condition, the connection scheme indicates that one of the first transceiver unit and the second transceiver unit is connected to a network and the other one of the first transceiver unit and the second transceiver unit is not connected to the network).

Step S560: Select one of the first transceiver unit and the second transceiver unit to be connected with the control unit (under this condition, the connection scheme indicates that both the first transceiver unit and the second transceiver unit are connected to a network).

Those skilled in the art can readily understand how each element operates by combining the steps shown in FIG. 5 and the elements shown in FIG. 1 or FIG. 2, and further description is omitted here for brevity.

Please note that, the steps of the abovementioned flowcharts are merely practicable embodiments of the present disclosure, and in no way should be considered to be limitations of the scope of the present disclosure. These methods can include other intermediate steps or several steps can be merged into a single step without departing from the spirit of the present disclosure.

The abovementioned embodiments are presented merely to illustrate practicable designs of the present disclosure, and should be considered to be limitations of the scope of the present disclosure. In summary, a network device having a first transceiver unit for processing a data corresponding to a first PHY layer via a first interface and a second transceiver unit for processing a data corresponding to a second PHY layer via a second interface, and a network connection method applied to the network device are provided. In other words, an implementation of two PHY layer circuits plus one MAC layer circuit is provided in the present disclosure, which is connected to the network with reference to the connection scheme. Compared with the prior art, not only the area of one MAC layer circuit can be saved, but also can the problem caused by the network loop be avoided in order to save system resources. Moreover, these two PHY layer circuits have the same hardware architecture, and thus they can use the same package so as to save cost.

Those skilled in the art will readily observe that numerous modifications and alterations of the device and method may be made while retaining the teachings of the disclosure.

What is claimed is:

1. A network device, comprising:
a first transceiver unit, arranged for processing a data corresponding to a first physical (PHY) layer via a first interface, comprising:
  a digital-to-analog converter (DAC), arranged for converting a first logic level of a transmission signal transmitted by the first transceiver unit into a first voltage potential and converting a second logic level of the transmission signal into a second voltage potential with reference to a control signal; and
  an analog-to-digital converter (ADC), arranged for converting the first voltage potential of a receiving signal received by the first transceiver unit into the first logic level and converting the second voltage potential of the receiving signal into the second logic level with reference to the control signal;
  wherein a voltage difference between the first voltage potential and the second voltage potential is equal to a first voltage amplitude supported by the first interface;
a second transceiver unit, arranged for processing a data corresponding to a second PHY layer via a second interface; and
a control unit, arranged for processing a data corresponding to a media access control (MAC) layer, wherein the control unit connects with at least one of the first transceiver unit and the second transceiver unit with reference to a connection scheme.

2. The network device according to claim 1, wherein when the connection scheme indicates that the first transceiver unit and the second transceiver unit are not connected to a network, the control unit connects with the first transceiver unit and the second transceiver unit with reference to the connection scheme.

3. The network device according to claim 1, wherein when the connection scheme indicates that one of the first transceiver unit and the second transceiver unit is connected to a network and the other one of the first transceiver unit and the second transceiver unit is not connected to the network, the control unit connects with the transceiver unit which is connected to the network and does not connect with the transceiver unit which is not connected to the network.

4. The network device according to claim 1, wherein when the connection scheme indicates that both the first transceiver unit and the second transceiver unit are connected to a network, the control unit selects to connect with one of the first transceiver unit and the second transceiver unit.

5. The network device according to claim 1, wherein the control unit and the first transceiver are respectively disposed on difference chips, the control unit and the second transceiver are respectively disposed on different chips, and the control unit is externally connected with the first transceiver unit and the second transceiver unit via a third interface.

6. The network device according to claim 5, wherein the third interface comprises a media independent interface (MII), a reverse media independent interface (RMII), a gigabit media independent interface (GMII), or a reverse gigabit media independent interface (RGMII).

7. The network device according to claim 1, wherein the second transceiver unit comprises:
   a digital-to-analog converter (DAC), arranged for converting a first logic level of a transmission signal transmitted by the second transceiver unit into a third voltage potential and converting a second logic level of the transmission signal into a fourth voltage potential with reference to the control signal; and
   an analog-to-digital converter (ADC), arranged for converting the third voltage potential of a receiving signal received by the second transceiver unit into the first logic level and converting the fourth voltage potential of the receiving signal into the second logic level with reference to the control signal;
   wherein a voltage difference between the third voltage potential and the fourth voltage potential is equal to a second voltage amplitude supported by the second interface, and the first voltage amplitude supported by the first interface is different from the second voltage amplitude supported by the second interface.

8. The network device according to claim 1, wherein the first interface is a high definition multimedia interface (HDMI).

9. A network connecting method, comprising:
   utilizing a first transceiver unit for processing a data corresponding to a first PHY layer via a first interface, comprising:
      converting a first logic level of a transmission signal transmitted by the first transceiver unit into a first voltage potential and converting a second logic level of the transmission signal into a second voltage potential with reference to a control signal; and
      converting the first voltage potential of a receiving signal received by the first transceiver unit into the first logic level and converting the second voltage potential of the receiving signal into the second logic level with reference to the control signal;
      wherein a voltage difference between the first voltage potential and the second voltage potential is equal to a first voltage amplitude supported by the first interface;
   utilizing a second transceiver unit for processing a data corresponding to a second PHY layer via a second interface;
   utilizing a control unit for processing a data corresponding to a MAC layer; and
   connecting the control unit with at least one of the first transceiver unit and the second transceiver unit with reference to a connection scheme.

10. The method according to claim 9, wherein the step of connecting the control unit with at least one of the first transceiver unit and the second transceiver unit with reference to the connection scheme comprises:
   when the connection scheme indicates that the first transceiver unit and the second transceiver unit are not connected to a network, connecting the control unit with the first transceiver unit and the second transceiver unit with reference to the connection scheme.

11. The method according to claim 9, wherein the step of connecting the control unit with at least one of the first transceiver unit and the second transceiver unit with reference to the connection scheme comprises:
   when the connection scheme indicates that one of the first transceiver unit and the second transceiver unit is connected to a network and the other one of the first transceiver unit and the second transceiver unit is not connected to the network, connecting the control unit with the transceiver unit which is connected to the network and disconnecting the control unit from the transceiver unit which is not connected to the network.

12. The method according to claim 9, wherein the step of connecting the control unit with at least one of the first transceiver unit and the second transceiver unit with reference to the connection scheme comprises:
   when the connection scheme indicates that both the first transceiver unit and the second transceiver unit are connected to a network, selecting one of the first transceiver unit and the second transceiver unit to be connected with the control unit.

13. The method according to claim 9, wherein the control unit and the first transceiver are respectively disposed on difference chips, the control unit and the second transceiver are respectively disposed on different chips, and the control unit is externally connected with the first transceiver unit and the second transceiver unit via a third interface.

14. The method according to claim 13, wherein the third interface comprises a media independent interface (MII), a reverse media independent interface (RMII), a gigabit media independent interface (GMII), or a reverse gigabit media independent interface (RGMII).

15. The method according to claim 9, wherein the step of utilizing the second transceiver unit comprises:
   converting a first logic level of a transmission signal transmitted by the second transceiver unit into a third voltage potential and converting a second logic level of the transmission signal into a fourth voltage potential with reference to the control signal; and
   converting the third voltage potential of a receiving signal received by the second transceiver unit into the first logic level and converting the fourth voltage potential of the receiving signal into the second logic level with reference to the control signal;
   wherein a voltage difference between the third voltage potential and the fourth voltage potential is equal to a second voltage amplitude supported by the second interface, and the first voltage amplitude supported by the first interface is different from the second voltage amplitude supported by the second interface.

16. The method according to claim 9, wherein the first interface is a high definition multimedia interface (HDMI).

* * * * *